United States Patent Office 3,516,650
Patented June 23, 1970

3,516,650
CUTTING DEVICE WITH SLIDABLY LINKED SUPPORTING POINTS
Alfred Pfeuffer, Neu-Isenburg, and Gerhard Komma, Duisburg, Germany, assignors to Messer Griesheim G.m.b.H., Frankfurt am Main, Germany, a corporation of Germany
Filed Apr. 15, 1968, Ser. No. 721,319
Claims priority, application Germany, Apr. 18, 1967,
D 52,836
Int. Cl. B23k 7/00; B26d 5/20
U.S. Cl. 266—23                             8 Claims

ABSTRACT OF THE DISCLOSURE

A cutting arrangement for continuous casting equipment wherein the workpiece rides on support points moving at same speed as the cutting tool is characterized by a plurality of support points slidable relative to each other which are linked together to be delayed or accelerated in their movement prior to the start of the separation cut so that the cutting will take place between adjacent support points.

BACKGROUND OF INVENTION

The invention relates to a device for coordinating the cutting point and support points in sectioning of workpieces made from continuous casting equipment.

After casting, the workpieces are cut into partial lengths, which (analogous to the usual permanent-mold casting) arrive in a rolling mill through a preheating furnace. The length of the partial cuts or segments is determined according to these requirements. The separating is carried out with autogenous and flame cutting machines. It has also been proposed to saw or to use plasmic torches, electron beams, ultrasonic tools, liquid or gas jets of high speed. During the cutting operation, the workpiece is located at the cutting point still in a warm condition, so that it is suitable for separation by a cutting oxygen jet. It is unavoidable, however, that the remaining jet issuing from the cutting nozzle also contacts the support of the workpiece. For example, slag pars remain suspended on the roll table rollers and hinder the rolling motion of the roller. However, if during the cutting wherein the cutting tool runs synchronously with the workpiece, the roll table rollers are contacted by the cutting oxygen jet, they are exposed to the remaining jet, which must be absolutely avoided.

The state of the art in this connection is to provide for supporting in a lowerable manner the roll table rollers situated under the cutting oxygen jet. For this a moving arrangement is required which accomplishes the raising and lowering on the cutting span. This, however, requires considerable mechanical output. It is also known to provide a roller chain which is moved at the same speed as the workpiece and is pulled back together with the torch at the end of the cut. In itself this makes it possible always to cut between two rollers, but the output is still considerable in order to be able to carry out the movements.

According to another known proposal (German Design Pat. 1,937,558, class 49h, 37) there are provided rollers deposited in the diameter, which form a canal along the absolute movement of the cutting torch to the stationary roll table. It is entirely possible to conduct the remainder of the focal ray into this recess, yet the problem is in no way solved of protecting the roll table rollers from slag parts and the radiation of heat of the remaining jet.

The known proposal provides for arranging the roll table rollers, displaced in relation to each other, according to the separating speed and advance speed, but then before the start of casting, the cutting length must be taken into consideration as well as the workpiece speed.

The cutting length, however, depend on an entirely special circle of viewpoints. Prior to the casting start, the ladle capacity is given by a crane scale, and the values processed in the electronic calculating machines allow to determine the length of the partial cuts ahead of time, yet such instances cannot be considered where varying cut-off lengths are desired. Unequal lengths result also in the practice when interstices must be removed from the workpiece which for special reasons should not be admitted to further processing.

SUMMARY OF INVENTION

The present invention starts off in that between two supporting points, as for example roll table rollers, the most advantageous possibility for flame cutting is when the rollers have such a spacing during the cutting operation that they are neither exposed to the touching by the cutting oxygen jet nor is there the spraying with slag residues to be feared.

The object of the invention, therefore, is to provide a device for the coordination of cutting point and support points in the sectioning of workpieces out of continuous casting equipment which guarantees that the cutting point always lies between or at least near the middle between two support points. In this connection, the device should make it possible to produce workpieces of any desired length at various workpiece speeds without requiring at the equipment any actions or adjustments in addition to the determination of the desired workpiece length. The solution of such a problem is difficult insofar as a permanent change of the important sizes exists because of the various workpiece speeds and variable cut-off lengths. A method of operation which takes this into consideration requires that a temporary "put in command" can be sufficiently certainly carried out. Not only the process but also the device should accordingly be equally movable and independent of both named important sizes.

The process of this invention coordinates the cutting point and supporting points in the sectioning of workpieces out of continuous casting equipment where the workpiece lies on support pieces moving at the workpiece speed and the tool carrying out the sectioning cut is moved along synchronously with the workpiece. According to the invention, several supporting points, slidable relative to each other, connected or linked together chain-like, are delayed or accelerated in their movement in the workpiece direction, prior to the start of the separating cut, in such a manner that the cutting point comes to lie at least approximately in the center between two supporting points.

As the separating tool for the invention, a flame cutting machine is primarily provided, since such, as mentioned above, can be particularly advantageously installed. The invention, however, is not limited to this; for example other separating tools such as those purely mechanical (e.g. saws) can also be used.

A very advantageous embodiment of the invention consists of constructing the supporting points, connected chain-like together, slidable relative to each other, as closed block chains. This step, however, while preferable, is not essential. The chain can also be constructed open and after each separating cut brought back to the starting position. In the block chains, the drive takes place in an advantageous manner by means of separately driven front and rear driving gears. The chain then runs with the speed of the workpiece, and the relative movement of the supporting points results by a short-time change of the speed ratio between front and rear driving gears.

For the novel device there is furthermore provided a measuring and control device, by means of which the always newly provided cutting point and the position of the supporting points at the start position of the cutting oxygen jet are compared with the required position of the supporting points. The measuring values are converted to a control impulse for the driving gears, whereby the above-named short-time change of the speed ratio is effected.

For the block chains per se varied embodiments are feasible. In a simpler form, for the rough operation of a continuous casting installation, the chain links consist of shackles provided with slots. Through the slots are conducted flexible stay bolts. Thus the chain links are connected together flexibly and movable relative to each other. The slots are provided with supporting arms, on which the workpiece is situated. The touching points of the supporting arms and of the workpiece form the supporting points. The flexible stay bolts can be supported on rollers which run in a rail as long as they carry the workpiece. However, other embodiments of the block chains are also feasible; the chain links can be connected together by means of flexible machine units, such as springs, for example.

The advantages of the invention consist first of all in that they make it possible—with certainty—to assure the cutting point always being in the space between two supporting points. This occurs entirely independently of the workpiece speed and of the desired workpiece length. It is suitable in an outstanding manner to automate a continuous casting installation, since an entire program of the most varied workpiece lengths can be accumulated and given into the dividing device. Even relatively short workpieces can be produced, since the adjustment of the supporting points at the newly provided cutting point can already take place, while at the preceding cutting point the separating step can still take place.

A considerable advantage of the invention consists also in that for the adjustment of the supporting points only slight accelerating and decelerating forces are required. This means wear decrease and energy savings as compared to the known embodiments, where entire roll table part must be moved.

THE DRAWINGS

DETAILED DESCRIPTION

Figure 1:
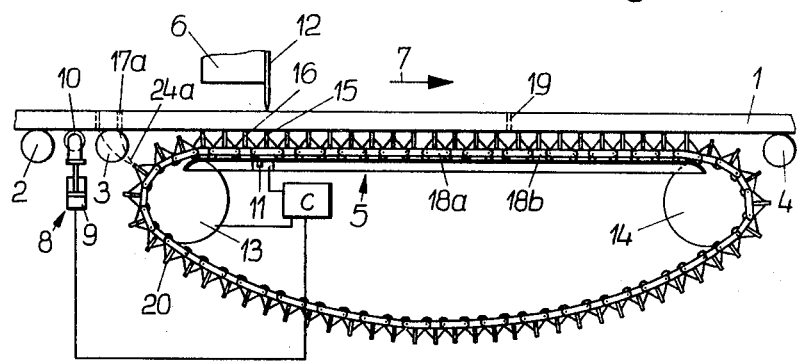
FIG. 1 represents a schematic side view of a device in accordance with this invention at one phase of operation.

In FIG. 1 the workpiece 1 moves, running on stationary roll table rollers, 2, 3, 4, over the cutting span, which essentially is formed by block chains 5. On these, the chain links (18a, 18b) of chain 5 support the workpiece. The cutting device, a flame cutting machine, is designated with 6 and runs with the speed and direction of the workpiece 1, as shown by an arrow 7. Between the stationary roll table rollers 2 and 3 there is located a run-through measuring device 8, which consists of a lifting cylinder 9 with pressure roller 10. A scanner 11 determines the position of the supporting points (15, 16) under the torch starting position.

In FIG. 1 the cutting device 6 has already left the preceding cutting point 19 and has returned to its starting position, which is characterized by the position of the cutting oxygen jet 12. The newly provided cutting point, designated by 17a, has just gone through the measuring device 8.

The newly provided cutting point 17a is at this moment still disposed by a certain distance from the starting position of the cutting oxygen jet 12. Upon arrival at this point, which is determined by the construction of the equipment, the correction command takes place. This can be administered manually, where by means of a counter in the run-through measuring device 8, the workpiece length passing through is measured. The command can also be taken from an accumulator.

After the correction command is accomplished, scanner 11 compares the position of the supporting points 15, 16 in the area of the starting position of the cutting oxygen jet 12 with the position of the supporting points 15, 16 which is required in order to achieve with certainty that the newly provided cutting point 17a upon arriving at the starting position of the cutting oxygen jet 12 comes to rest between both supporting points 15, 16. According to the difference between the actual and the required position of the supporting points 15, 16, a control impulse takes place at the rear driving gears 13 of the block chains 5, which then temporarily turn with increased speed of rotation. Thereby those chain links 18a, 18b are pushed together before the starting position of the cutting oxygen jet 12 which still do not carry the workpiece.

Figure 2:
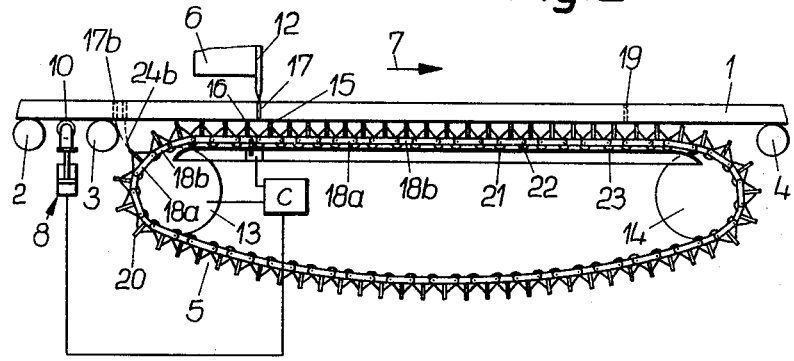
FIG. 2 represents the same view as in FIG. 1, in a different phase of operation.

In FIG. 2 the correction command is already illustrated, and the newly provided cutting point, now designated by 17, has reached the starting position of the cutting oxygen jet 12. At this moment occurs the cutting command, and the flame cutting machine 6 begins to divide or sever the workpiece 1 by means of the cutting oxygen jet. The flame cutting machine 6 moves forward in this connection with the same speed as the workpiece. Before the new cutting point 17 there is located a number of pushed-together chain links 18a, 18b. These chain links 18a, 18b are again loosened as soon as they no longer must carry the workpiece 1 and the tractive force of the front driving gears 14 can operate freely.

It is not at all required that the scanner 11 exactly measure the position of the supporting points 15, 16 under the starting position of the cutting oxygen points 17, 19. Numerous other measuring points may be used, wherein a clear geometrical reference exists between the position of the supporting points 15, 16 and the position of the newly provided cutting point (17a) at the moment of the correction command. Thus the setting of the rear driving gears 13 for example can also serve as a measuring basis. This is clear in FIGS. 1 and 2. In FIG. 1 the newly provided cutting point 17a is connected by a connecting line 24a with the point of the driving gears 13 or with the chain links 18a, 18b corresponding to this point on which they come to rest in case no correction is carried out. Accordingly, it would be situated on a supporting arm 20. If in FIG. 2, where the correcting movement is already illustrated, the newly provided cutting point, now designated by 17, is once more entered at the same point and the connecting line is again drawn, one recognizes that in this instance the newly provided cutting point 17b would come to rest exactly between two supporting arms 20.

Figure 4:
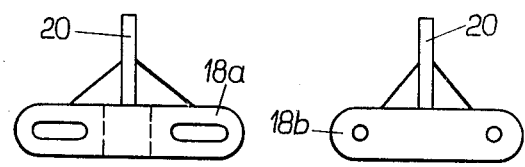
FIG. 4 shows a cutout of the block chains in accordance with one aspect of this invention.
Figure 3:
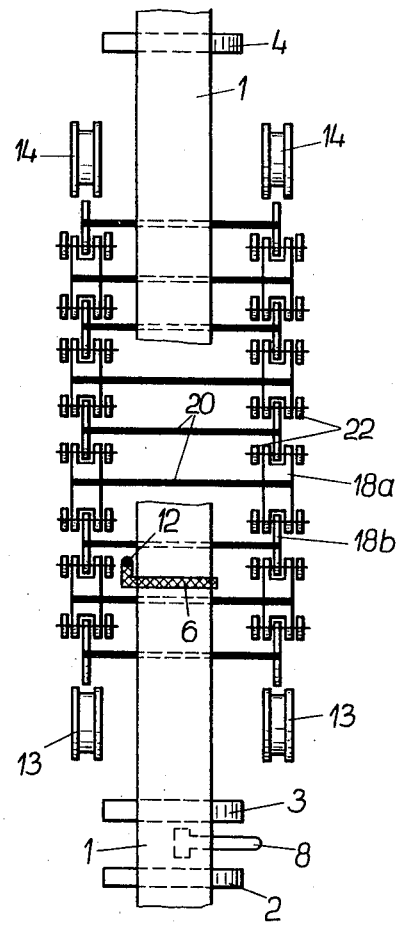
FIG. 3 is a top view of the device of FIG. 2.
Figure 5:
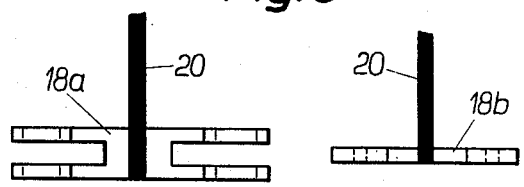
FIG. 5 is a top view of the device of FIG. 4.

The construction of the block chains 5 is apparent from FIGS. 3–5. Block chains 5 consist of chain links 18a, 18b, of which chain links 18a are provided with slots, while chain links 18b have round holes. The chain links are connected together by means of flexible stay bolts 21, which at the same time represent the axes for rollers 22. Rollers 22 run in rails 23. Always, two chain links 18a or 18b, situated parallel to each other, are connected together by means of a supporting arm 20 on which bar 1 is situated.

Many variations of this design are possible within the spirit of this invention. It is especially not required to provide all chain links 18a and 18b with supporting arms 20; it is sufficient to connect together in this manner every second or fewer link pairs.

Of course, the use of the invention can take place not only by means of the block chains 5 shown, but instead the required free space for the cutting oxygen jet 12 can be provided by the automatic moving of the supporting points 15, 16. It is a considerable advantage of the invention in the present exemplified embodiment that without burdening the chain links 18a, 18b, the distance change can be undertaken while chain 5 itself is set under the weight of bar 1. There is achieved therefore in a particularly skillful manner a simple adjusting without load, however, a subsequent adjusting is avoided by the weight of the bar.

What is claimed is:

1. In a device for coordinating the cutting point and supporting points in the cutting of continuously cast workpieces wherein the work piece is mounted on continuously moving supporting points and a cutting means is continuously moved from a cutter starting position, characterized in that said supporting points are slidable relative to each other and are linked together to form closed block chains, gear means for driving said block chains, said gear means including a rear gear means independently movable of a forward gear means, and measuring and controlling means for detecting the position of the oncoming cutting point on the workpiece relative to a pair of adjacent supporting points at the cutter starting position to actuate said rear gear means in a compensating manner to maintain the cutting point at approximately the middle of said adjacent supporting points when the cutting operation begins.

2. In the device of claim 1 wherein said block chains comprise links in the form of slotted shackles flexibly connected by stay bolts for movement in the direction of movement of the workpiece.

3. In the device of claim 2 wherein said links are provided with workpiece supporting arms.

4. In the device of claim 3 including a guide rail, rollers riding on said rail, said stay bolts being supported by said roller, said bolts carrying the workpiece over said supporting arms.

5. In the device of claim 4 wherein said measuring and controlling means includes a run-through measuring device disposed a predetermined distance from the starting position of the cutting means, scanning means for determining the position of said adjacent supporting points in the area of said starting position of said cutting means, and a control device for converting the measuring values to control impulses to effectuate a compensating movement by said rear gear means for displacing said adjacent supporting points.

6. In the device of claim 5 wherein said cutting means is a cutting oxygen torch.

7. In the device of claim 1 wherein said measuring and controlling means includes a run-through measuring device disposed a predetermined distance from the starting position of the cutting means, scanning means for determining the position of said adjacent supporting points in the area of said starting position of said cutting means, and a control device for converting the measuring values to control impulses to effectuate a compensating movement by said rear gear means for displacing said adjacent supporting points.

8. In the device of claim 7 wherein said cutting means is a cutting oxygen torch.

References Cited

UNITED STATES PATENTS

| | | | |
|---|---|---|---|
| 3,443,805 | 5/1969 | Greenberger | 266—23 |
| 3,462,134 | 9/1969 | Michelson | 266—23 |

ROBERT D. BALDWIN, Primary Examiner

U.S. Cl. X.R.

83—155, 360